No. 861,302. PATENTED JULY 30, 1907.
H. J. MIBACH.
SEWER TRAP VENT ATTACHMENT.
APPLICATION FILED AUG. 1, 1906.
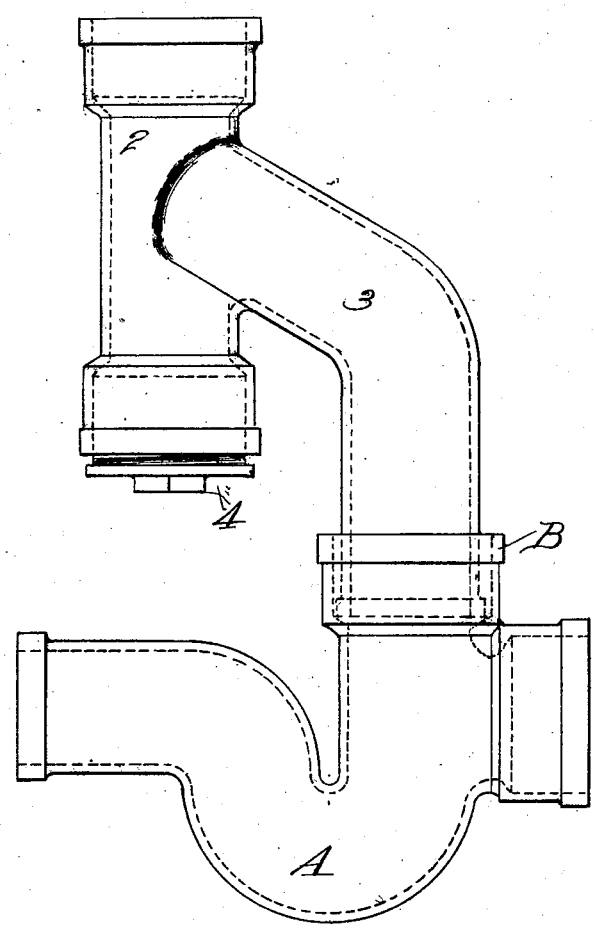
WITNESSES:
INVENTOR
Henry J. Mibach,
BY
Geo. K. Strong
ATTORNEY

UNITED STATES PATENT OFFICE.

HENRY J. MIBACH, OF SAN FRANCISCO, CALIFORNIA.

SEWER-TRAP-VENT ATTACHMENT.

No. 861,302.  Specification of Letters Patent.  Patented July 30, 1907.

Application filed August 1, 1906. Serial No. 328,756.

*To all whom it may concern:*

Be it known that I, HENRY J. MIBACH, a citizen of the United States, residing in the city and county of San Francisco and State of California, have invented new and useful Improvements in Sewer-Trap-Vent Attachments, of which the following is a specification.

My invention relates to a vent attachment for sewer pipes.

It consists in the combination with a sewer pipe of a vent attachment which is set out of line with the trap, and with means of access for cleaning the same.

Referring to the accompanying drawings for a more complete explanation of my invention, the figure is an elevation of my device.

A is a sewer trap of any usual or convenient construction. These traps are usually set several feet below the basement extension. In order to prevent back pressure from the sewer and gas escaping therefrom into the building, it is desirable to connect an air vent with the trap. If such vent be connected directly in line with the trap, any foreign substance introduced into the upper open end of the trap, which is ordinarily on a level with the sidewalk, will enter the trap and will clog the vent and prevent the escape of gas.

It is the object of my invention to protect the vent from such obstruction and to provide an easy means of cleaning it in case of necessity.

The trap A may have its opposite ends connected with the building and with the sewer respectively.
Projecting upwardly from the trap is a coupling B; 2 is my air vent, which as shown is set out of line with the coupling B and is connected therewith by the curved pipe 3. The open upper end of the vent 2 will then lie in any usual position, and as the axis of the vent pipe is out of line with the trap and the opening B, it will be seen that any rubbish which may blow or be otherwise carried into the vent-pipe 2, will fall into the lower part of said pipe and not interrupt the free passage of air or gas through connection 3.

4 is a plug located at the lower end of the vent pipe 2, and this plug is in such position that it may easily be removed at any time for the purpose of cleaning the pipe from any material, which it is desirable to remove.

By this construction, I first prevent the access of most, if not all, of the foreign matter into the trap and provide a receptacle for such foreign matter, which receptacle is of such convenient access from the vent-pipe that it may be cleaned at any time without tearing out the trap or otherwise interfering with its ordinary functions.

Having thus described my invention, what I claim and desire to secure by Letters Patent, is—

The combination with a sewer-trap having opposite ends adapted to be connected with a building and with a sewer respectively, and having a coupling projecting from its upper side, of an air-vent disposed in a higher plane than the trap and its coupling, said vent being vertically disposed and being set to one side of the vertical plane of the sewer-trap-coupling and having a curved pipe connecting its intermediate portion with said coupling, said air-vent being formed with a chamber below the curved pipe, and a removable plug forming a closure for the lower end of said chamber, for the purpose of cleaning the pipe from any material which may enter said chamber through the upper end of the vent pipe.

In testimony whereof I have hereunto set my hand in presence of two subscribing witnesses.

HENRY J. MIBACH.

Witnesses:
 WM. SWARTLEY,
 EDW. J. MOLDRUP,